(12) United States Patent
Chaoui

(10) Patent No.: US 8,044,704 B2
(45) Date of Patent: Oct. 25, 2011

(54) CURRENT CONTROLLER AND METHOD THEREFOR

(75) Inventor: Hassan Chaoui, Toulouse (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 54 days.

(21) Appl. No.: 11/814,660

(22) PCT Filed: Jul. 7, 2006

(86) PCT No.: PCT/US2006/026674

§ 371 (c)(1),
(2), (4) Date: Jul. 24, 2007

(87) PCT Pub. No.: WO2008/005024

PCT Pub. Date: Jan. 10, 2008

(65) Prior Publication Data

US 2010/0039165 A1  Feb. 18, 2010

(51) Int. Cl.
*G05F 1/10* (2006.01)

(52) U.S. Cl. ....................................... 327/535

(58) Field of Classification Search .................. 327/530, 327/534–538, 540, 541, 543; 363/59, 60
See application file for complete search history.

(56) References Cited

U.S. PATENT DOCUMENTS

| | | | |
|---|---|---|---|
| 6,856,525 B2 * | 2/2005 | Wallis | 363/59 |
| 6,873,203 B1 * | 3/2005 | Latham et al. | 327/538 |
| 6,980,047 B1 * | 12/2005 | Kuo | 327/537 |
| 7,271,642 B2 * | 9/2007 | Chen et al. | 327/514 |
| 7,279,959 B1 * | 10/2007 | Choy | 327/536 |
| 7,304,871 B2 * | 12/2007 | Ito et al. | 363/59 |
| 7,403,405 B2 * | 7/2008 | Conte et al. | 363/59 |
| 7,411,799 B2 * | 8/2008 | Muggler et al. | 363/60 |
| 7,417,471 B2 * | 8/2008 | Gong et al. | 327/50 |
| 7,479,820 B2 * | 1/2009 | Okamoto et al. | 327/535 |
| 2004/0113495 A1 * | 6/2004 | Matsuo et al. | 307/29 |

* cited by examiner

*Primary Examiner* — Lincoln Donovan
*Assistant Examiner* — Sibin Chen
(74) *Attorney, Agent, or Firm* — Robert F. Hightower

(57) ABSTRACT

In one embodiment, a current controller is configured to control a value of the current without regulating a voltage formed by the controller.

12 Claims, 3 Drawing Sheets

CURRENT CONTROLLER AND METHOD THEREFOR

CROSS-REFERENCE TO RELATED APPLICATIONS

This application is related to an application entitled "LOW DROP-OUT CURRENT SOURCE AND METHOD THEREFOR" having inventor Hassan Chaoui, PCT/US06/26673, a common inventor, a common assignee, and filed concurrently herewith which is hereby incorporated herein by reference.

BACKGROUND OF THE INVENTION

The present invention relates, in general, to electronics, and more particularly, to methods of forming semiconductor devices and structure.

In the past, the semiconductor industry utilized various methods and structures to form DC/DC converters that utilized charge pump circuits to control the output voltage formed by the converter. These converters typically monitored the value of the output voltage and switched the mode of the charge pump circuit in order to regulate the value of the output voltage. Typically, a feedback voltage that was representative of the value of the output voltage was compared to a reference voltage and the mode of the charge pump circuit would be changed if the feedback voltage fell below the value of the reference voltage. One example of such a DC/DC converter was disclosed in U.S. Pat. No. 6,411,531 that issued to Nork et al on Jun. 25, 2002. One problem with these prior DC/DC converters was the area consumed by the reference voltage circuit, the comparator, and the other closed loop elements. The circuits generally required a large area on the semiconductor die on which the circuit was formed thereby increasing the cost of the converter circuit.

Accordingly, it is desirable to have a controller circuit that utilizes less die area and that has a lower cost.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
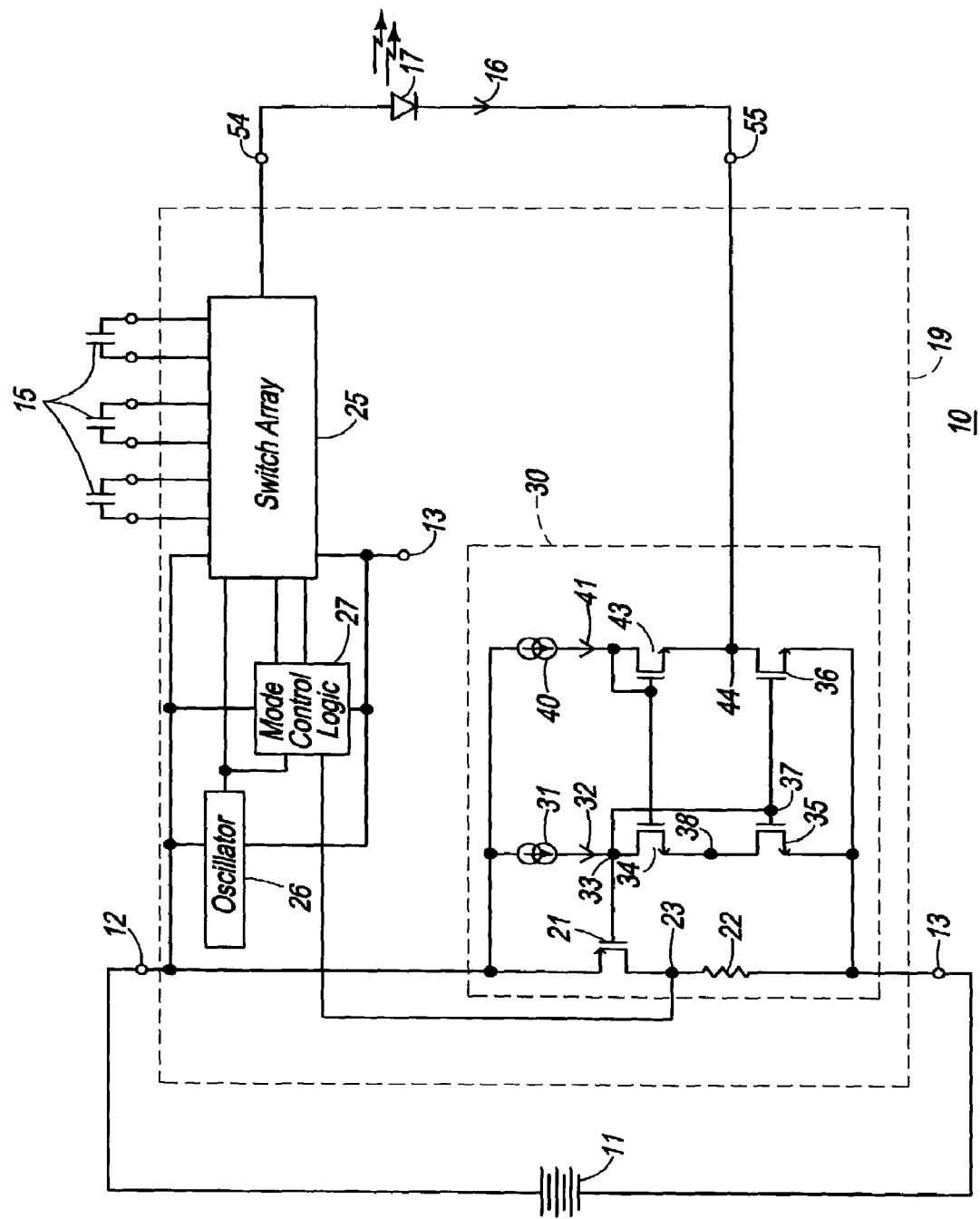
FIG. 1 schematically illustrates an embodiment of a portion of a light emitting diode (LED) control system that includes a charge pump controller in accordance with the present invention.

FIG. 1 schematically illustrates an example embodiment of a portion of a light emitting diode (LED) control system 10. System 10 includes a charge pump controller 19 that controls the value of a load current 16 to a substantially constant value without regulating the value of an output voltage formed by controller 19. System 10 typically includes a DC voltage source, such as a battery 11, that supplies power to controller 19. Controller 19 receives the power between a voltage input 12 and a voltage return 13, and supplies current 16 in addition to the output voltage on an output 54. Controller 19 may be referred to as a DC/DC converter. Controller 19 receives a sense signal on a sense input 55 that is representative of the value of current 16 and responsively controls the value of current 16 to be substantially constant in order to accurately control the amount of light emitted by LED 17. In the preferred embodiment, the sense signal is mainly understood as a current that is substantially equal to the value of current 16 and has a voltage. In other embodiments, the sense signal may be understood as a voltage and may have other values that are representative of the value of current 16.

Controller 19 typically includes a current controller 30, a switch matrix or switch array 25, an oscillator 26, and mode control logic 27. Switch array 25 typically includes a plurality of transistors that are connected to a plurality of capacitors 15. Switch array 25 alternately charges and discharges capacitors 15 and connects capacitors 15 in various configurations to form the output voltage on output 54 and to supply current 16. Array 25 typically configures capacitors 15 to form the output voltage to be a multiple of the value of the voltage received between input 12 and returned 13. Capacitors 15 usually are external to a semiconductor die on which controller 30 or controller 19 is formed. Oscillator 26 provides a clock signal that is used during the operation of array 25. Mode control logic 27 receives a mode control signal that is formed at a node 23 and provides signals to array 25 that control the configuration or state in which array 25 operates. In the preferred embodiment, array 25 is configured to operate in at least a 1.0×, 1.3×, 1.5×, or 2.0× multiplier mode. Switch arrays capable of operating in these various modes are well known to those skilled in the art.

Controller 30 is configured to force the mode control signal on node 23 to a first state, high for example, responsively to the value of the sense signal on input 55 being substantially equal to a first value, and to force the mode control signal to a second state, low for example, responsively to the value of the sense signal being less than the first value. The low mode control signal causes logic 27 to change the control signals and the operating state of array 25 to the next higher multiplier mode in order to increase the value of the output voltage so that current 16 may be controlled to remain substantially constant. If, after the change to the new multiplier mode of array 25, the sense signal increases to a value substantially equal to the first value, the mode control signal goes high and array 25 stays in the new multiplier mode.

Controller 30 receives an operating voltage for operating controller 30 between input 12 and return 13. Controller 30 includes a first current source 40 that provides a first reference current, a second current source 31 that provides a second reference current, an output device implemented as a transistor 36, a reference device implemented as a transistor 35, a switch implemented as a transistor 21, a pull-down resistor 22, and a current mirror that includes a current mirror input device implemented as a transistor 43, and a current mirror output device implemented as a transistor 34.

In operation and if the voltage from battery 11 is sufficient to supply current 16, array 25 is set to a multiplier mode, for example the 1.0× multiplier mode, and supplies current 16 and an output voltage that is substantially equal to the value of battery 11. LED 17 drops some of the voltage from battery 11 and the remainder of the voltage from battery 11 is applied to input 55 as an input voltage. Controller 30 also receives current 16 on input 55. Current sources 40 and 31 form respective first and second reference currents 41 and 32 that are substantially equal in value. Since transistor 43 is connected in a diode configuration, transistor 43 operates in the saturated region of the characteristics of transistor 43 and current 41 flows through transistor 43 to form a gate-to-source voltage (Vgs) for transistor 43. Because of the substantially equal value of currents 32 and 41 in addition to the current mirror configuration of transistors 43 and 34, current 32 forces the Vgs of transistor 34 to be substantially equal to the Vgs of transistor 43, thus, the source voltage of transistor 34 follows and is substantially equal to the source voltage of transistor 43 which is substantially equal to the input voltage on input 55. Thus, the current mirror of transistors 34 and 43 forms a reference voltage on a node 38 that is at the same potential relative to return 13 as the input voltage on input 55. This makes the drain-to-source voltage (Vds) of transistor 35 substantially equal to the Vds of transistor 36. The gate of transistors 35 and 36 are connected to the drain of transistor 34, thus, the Vgs of transistors 34 and 35 are equal. As long as the voltage from battery 11 is greater than the forward voltage drop across LED 17 plus the Vds(sat) of transistor 36, the Vgs of transistor 35 is approximately at the threshold voltage of transistor 35, typically less than about 1.2 volts. This low voltage is also applied to node 33, thus, to the gate of transistor 21. The low gate voltage enables transistor 21 which pulls node 23 substantially to the voltage of input 12. This applies a logical high signal to logic 27. The high mode control signal keeps array operating in the current multiplier mode.

Since the Vds and Vgs voltages of transistors 35 and 36 are substantially equal, the current through transistor 36 is forced to equal the current through transistor 35 times the active area ratio between the two transistors. In the preferred embodiment, the active area ratio is 1:1000 and transistors 35 and 36 function as a current mirror with the current through transistor 36 controlled by transistor 35 to be approximately one thousand (1000) times the value of current 32 that flows through transistor 35. The current through transistor 36 is equal to current 41 plus current 16. Since current 41 is equal to current 32, current 16 is approximately equal to nine hundred ninety nine (999) times the value of current 32. Those skilled in the art will appreciate that the active area ratio may be different than 1:1000 and as long as the ratio is greater than 1:1.

Since the Vds and Vgs of transistors 35 and 36 are substantially equal, the value of the current through transistor 36 is substantially independent of the value of the voltage on input 55. Because the gates of transistors 35 and 36 are connected to the drain of transistor 34, the Vgs of transistors 35 and 36 is free to vary from a low value of approximately equal to the threshold voltage (VT) of transistor 35 to an upper limit of approximately the value of the input voltage on input 12 minus the Vds(sat) of current source 31. The Vds(sat) usually is understood to be the minimum voltage needed across a device in order to carry the current that is requested to flow through the device. Because the Vgs of transistors 35 and 36 is free to vary over such a range, the current mirror of transistors 35 and 36 can vary between operating in the saturated region of the characteristics of transistors 35 and 36 to operating in the linear region of those characteristics. For example if the input voltage on input 55 is lower than the Vds(sat) of transistor 36, such as the voltage from battery 11 being low, transistors 35 and 36 may operate in the linear region, and if the input voltage on input 55 is higher than the Vds(sat) of transistor 36, transistors 35 and 36 may operate in the saturated region. Consequently, controller 30 can provide a substantially constant current through input 55 even if the value of the voltage on input 55 approaches zero regardless of whether transistors 35 and 36 are operating in the linear or saturated operating regions.

As system 10 continues to operate, current 16 eventually causes the voltage from battery 11 to decrease. As the voltage from battery 11 decreases, controller 30 keeps the value of current 16 substantially constant and the voltage at input 55 decreases. The reference voltage on node 38 follows the input voltage and also decreases. Because the reference voltage decreases and because current 32 remains constant, the Vgs of transistor 35 has to increase which also increases the voltage on node 33. Increasing the voltage on node 33 increases the gate voltage applied to transistor 21. If the voltage from battery 11 decreases sufficiently for the voltage on input 55 to decrease to a value less than the Vds(sat) of the current controller 30 then controller 30 can not control current 16 to the substantially constant value and the value of current 16 decreases. As node 33 increases past the threshold voltage of transistor 21 current 16 also decreases to a first value, transistor 21 turns off, and resistor 22 pulls the voltage on node 23 to substantially the voltage of return 13, thereby forcing the mode control signal low. The Vds(sat) of controller 30 usually is understood to be the minimum voltage needed at node 44 in order to carry the current that is requested to flow through the device. As can be seen from the description, the Vds(sat) of the controller 30 is smaller than the Vds(sat) of transistor 35 which improves the efficiency of the whole system. Logic 27 receives the low mode control signal and changes the operating state of array 25 to operate in the next higher multiplier mode. In this example explanation, logic 27 changes the control signals to control array 25 to switch from operation in the 1.0× multiplier mode and operate in the 1.3× multiplier mode. In this mode, array 25 forms the output voltage to be approximately 1.3 times the value of the voltage received from battery 11. If the mode control signal on node 23 remains low, logic 27 may change the control signals to cause array 25 to operate in the next higher multiplier mode, such as the 1.5× multiplier mode. Typically, the higher voltage from output 54 increases the value of current 16 and the value of the voltage received on input 55 and a corresponding voltage is formed on node 38. The higher voltage on node 38 decreases the Vgs of transistor 35 and the corresponding voltage on the gate of transistor 21 thereby again enabling transistor 21 and forcing the mode control signal high.

If the value of the voltage from battery 11 increases, such as the battery being charged, logic 27 is configured to change the operating mode of array 25. At some time during the operation of array 25, such as operating in multiplier mode N (ex: 2×), logic 27 reduces the operating mode of array 25 to the next lower multiplier mode, such as multiplier mode N−1 (ex: 1.3×). If the voltage from battery 11 has increased, then the mode control signal may remain high and logic 27 keeps array 25 operating in that multiplier mode, multiplier mode N−1

(ex: 1.3×). If the mode control signal goes low, logic 27 increases the operating mode to the next higher multiplier mode, such as multiplier mode N (ex: 2×). Logic 27 may operate this mode reduction algorithm at some fixed frequency, for example once every one milli-second (1 msec.).

Those skilled in the art will appreciate that the goal is to configure current sources 31 and 40, and transistors 34-36 and 43 so that the current 16 remains substantially constant. However, as is well known in the art there are always minor variances that prevent the current from being exactly constant. It is well established in the art that variances of up to about ten percent (10%) are regarded as reasonable variances from the ideal goal of exactly constant.

In order to assist in implementing this functionality for controller 30, a drain of transistor 43 is coupled to receive current 41 from current source 40. A first terminal of current source 40 is coupled to receive the input voltage from input 12 and a second terminal is commonly connected to the gate and a drain of transistor 43 and to the gate of transistor 34. A source of transistor 43 and a drain of transistor 36 are coupled to receive the input voltage from input 55. Input 55 is connected to a source of transistor 43 and to a drain of transistor 36. A source of transistor 36 is connected to receive the common voltage on voltage return 13. A source of transistor 35 is connected to return 13. The gate of transistor 35 is connected to the gate of transistor 36 and is connected to receive current 32. A drain of transistor 35 is connected to a source of transistor 34. The drain of transistor 34 is commonly connected to a first terminal of current source 31, to the gate of transistor 21, and to a gate of transistor 35. A second terminal of source 31 is connected to the first terminal of source 40. A source of transistor 21 is connected to input 12. A drain of transistor 21 is connected to a first terminal of resistor 22 and to a mode control input of logic 27. A second terminal of resistor 22 is connected to return 13.

Figure 2:
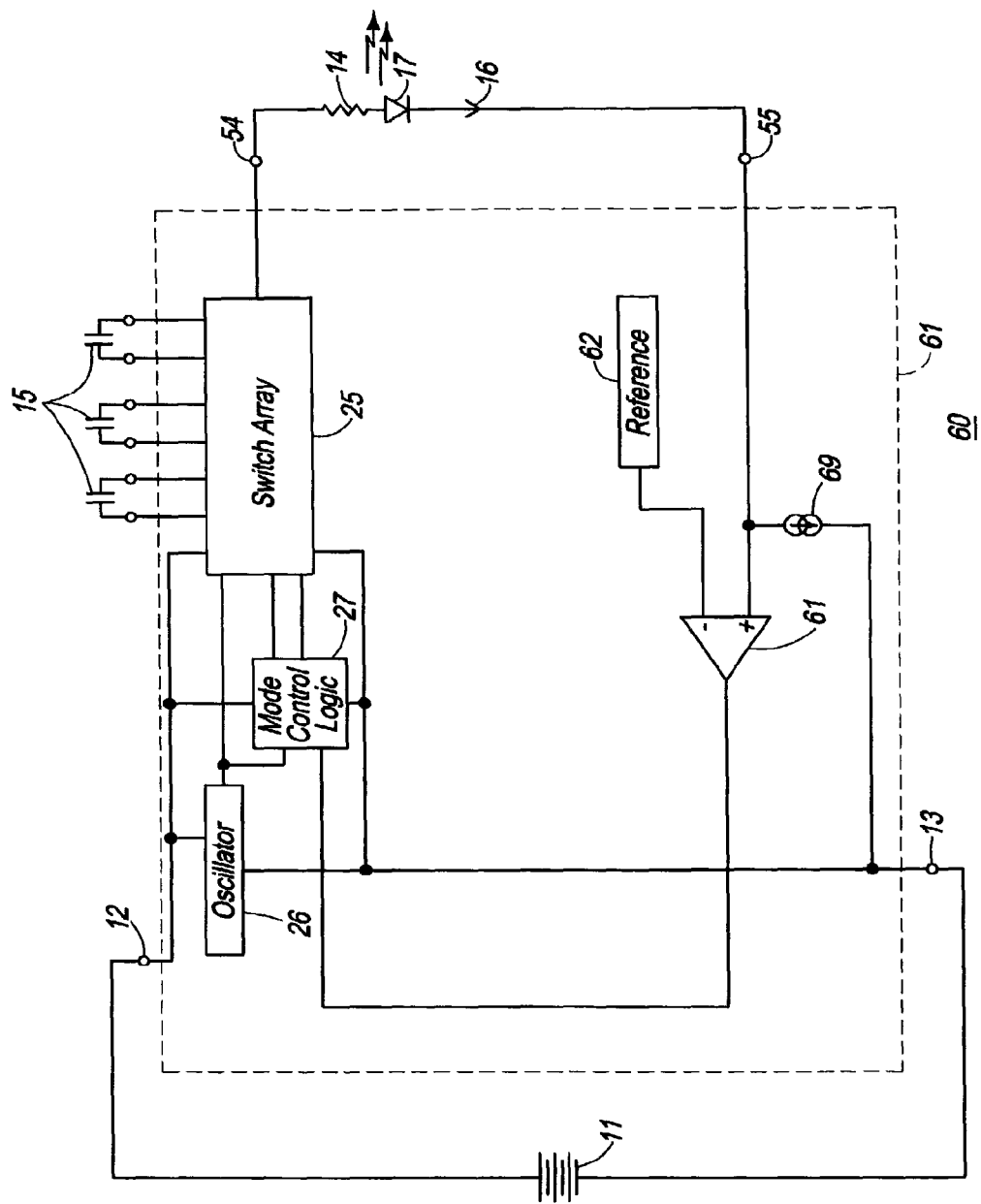
FIG. 2 schematically illustrates an embodiment of a portion of an LED system that is an alternate embodiment of the LED system of FIG. 1 and includes a charge pump controller that is an alternate embodiment of the charge pump controller of FIG. 1 in accordance with the present invention.

FIG. 2 schematically illustrates an example embodiment of a portion of a light emitting diode (LED) control system 60 that is an alternate embodiment of system 10 explained in the description of FIG. 1. System 60 includes a charge pump controller 61 that is an alternate embodiment of controller 19 explained in the description of FIG. 1. Controller 61 includes a comparator 63 that forms the mode control signal explained in the description of FIG. 1. Comparator 63 receives the sense signal from input 55 and a reference signal from a reference 62. Comparator forces the mode control signal high responsively to the voltage received on input 55 being greater than the first value and forces the mode control signal low responsively to the voltage on input 55 being no greater than the first value. Thus, the value of the signal from reference 62 forms the first value and controller 61 controls the value of load current 16 to a substantially constant value without regulating the value of an output voltage formed by controller 61.

Figure 3:
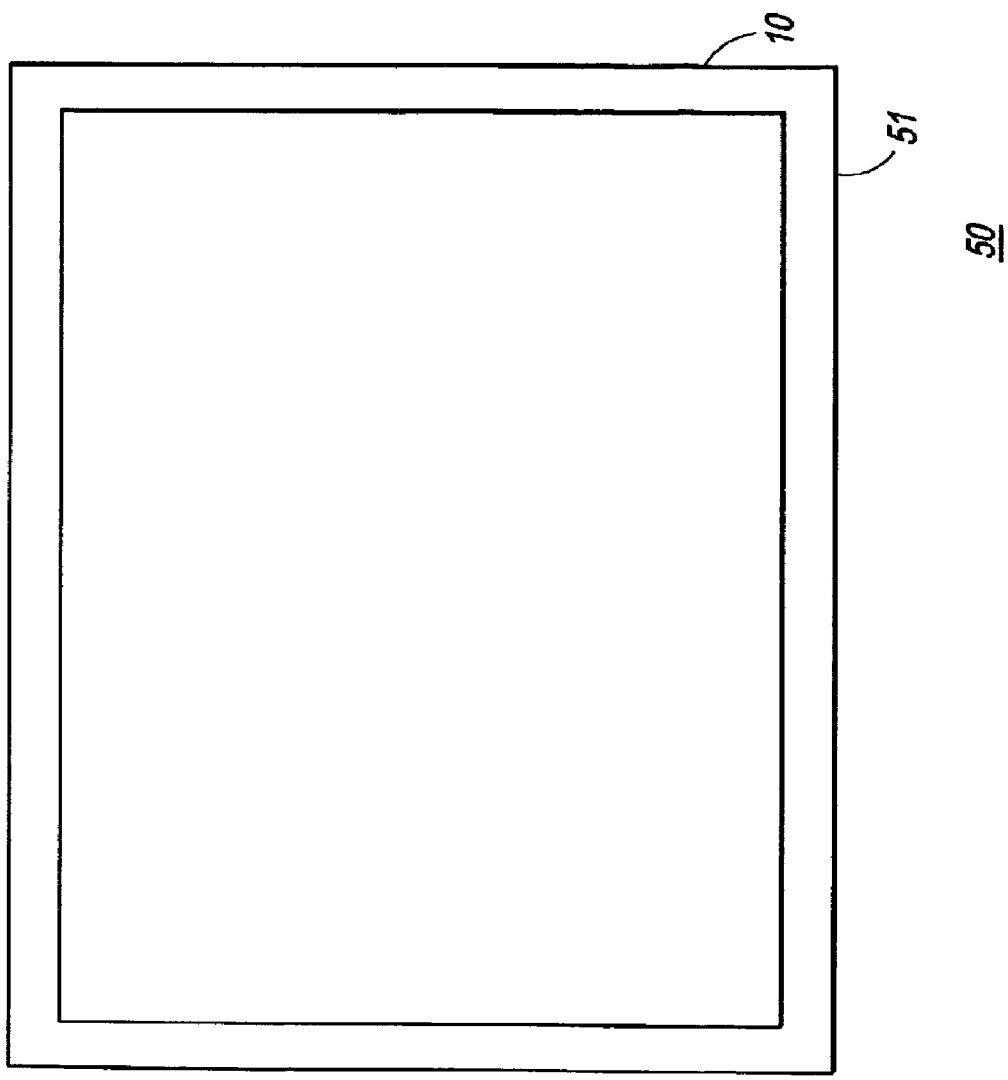
FIG. 3 schematically illustrates an enlarged plan view of a semiconductor device that includes the charge pump controller of FIG. 1 in accordance with the present invention.

FIG. 3 schematically illustrates an enlarged plan view of a portion of an embodiment of a semiconductor device or integrated circuit 50 that is formed on a semiconductor die 51. Controller 30 or controller 61 are formed on die 51. Die 51 may also include other circuits that are not shown in FIG. 3 for simplicity of the drawing. Controller 30 or controller 61 and device or integrated circuit 50 are formed on die 51 by semiconductor manufacturing techniques that are well known to those skilled in the art.

In view of all of the above, it is evident that a novel device and method is disclosed. Included, among other features, is using a controller that controls a value of the load current through an LED without regulating a value of a voltage formed by the controller. Controlling the current without controlling the voltage facilitates forming a smaller semiconductor die thereby reducing the costs of the controller. In one embodiment, the controller is configured to use two current sources to form a current though a first current mirror and uses the first current mirror to control the Vds of a second current mirror. Configuring the first current mirror to operate in the saturated region assists in controlling the Vds of the second current mirror. Coupling the second current mirror to operate in either the linear region or the saturated region assists in allowing the current source to operate at low values of an input voltage that is received on a current output of the current source. Additionally, forming transistors 35 and 36 have the same Vds and Vgs facilitates the current mirror of transistors 35 and 36 operating in either the linear or saturated regions. Thus, controller 30 controls the value of current 16 to be substantially constant for values of current 16 that are less than a first value and forms a control signal to set an operating mode of matrix 25 responsively to the first value of the current 16.

While the subject matter of the invention is described with specific preferred embodiments, it is evident that many alternatives and variations will be apparent to those skilled in the semiconductor arts. For example, resistor 22 could be a current source or transistor 21 and resistor 22 may be an analog comparator or a digital inverter. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A charge pump controller comprising:
   a switch matrix having a plurality of switch configuration modes, the switch matrix configured to receive an input voltage and form an output voltage that is a multiple of the input voltage and configured to supply the output voltage and a load current to a load; and
   a current controller configured to receive a sense signal that is representative of the load current and form a mode control signal to set an operating mode of the switch matrix responsively to a first value of the load current in order to regulate a value of the load current to a substantially constant value without regulating a value of the output voltage, the current controller further including first and second reference current generators configured to form first and second reference currents that are substantially equal.

2. The charge pump controller of claim 1 wherein the current controller is configured to control a value of the load current to be proportional to one of the first or second reference currents for values of the load current that are less than the first value of the load current.

3. The charge pump controller of claim 1 wherein the current controller includes a first input device configured to receive the first reference current,
   a second input device operably coupled to receive the second reference current and responsively control the first input device to form a reference voltage.

4. The charge pump controller of claim 3 further including a reference device operably coupled to receive the reference voltage and the first reference current and responsively control an output device to form an output current that is proportional to the first reference current.

5. The charge pump controller of claim 4 wherein the first input device includes a first transistor having a first current carrying electrode coupled to receive the first reference current, a second current carrying electrode coupled to provide the reference voltage, and a control electrode.

6. The charge pump controller of claim 1 wherein the current controller is configured to control the load current that flows through the load of a light emitting diode.

7. A charge pump controller comprising:
- a switch matrix having a plurality of switch configuration modes, the switch matrix configured to receive an input voltage and form an output voltage that is a multiple of the input voltage and configured to supply the output voltage and a load current to a load; and
- a current controller configured to receive a sense signal that is representative of the load current and form a mode control signal to set an operating mode of the switch matrix responsively to a first value of the load current in order to regulate a value of the load current to a substantially constant value without regulating a value of the output voltage, the current controller including a first input device configured to receive a first reference current, a second input device operably coupled to receive a second reference current that is substantially equal to the first reference current and responsively control the first input device to form a reference voltage wherein the first input device includes a first transistor having a first current carrying electrode coupled to receive the first reference current, a second current carrying electrode coupled to provide the reference voltage, and a control electrode, and wherein the first input device includes a second transistor having a first current carrying electrode coupled to receive the second reference current, a second current carrying electrode coupled to receive the sense signal, and a control electrode coupled to the control electrode of the first transistor and to the first current carrying electrode of the second transistor.

8. The charge pump controller of claim 7 wherein the reference device includes a third transistor having a first current carrying electrode coupled to receive the reference voltage, a control electrode coupled to the first current carrying electrode of the first transistor, and a second current carrying electrode and wherein the output device includes a fourth transistor having a first current carrying electrode coupled to receive the sense signal, a control electrode coupled to the control electrode of the third transistor, and a second current carrying electrode coupled to the second current carrying electrode of the third transistor.

9. A method of forming a current controller comprising:
- configuring the current controller to receive a sense signal that is representative of a load current wherein the sense signal has a first voltage and responsively regulate a value of the load current to a substantially constant value without regulating the first voltage to a substantially constant value;
- configuring the current controller to form first and second reference currents and control the load current to be proportional to one of the first reference current or second reference current;
- coupling a first transistor to receive the first reference current and form a reference voltage that follows the first voltage; and
- coupling a second transistor to receive the second reference current and receive the sense signal and control the first transistor to form the reference voltage.

10. The method of claim 9 further including configuring the current controller to provide a mode control signal that has a first state for values of the load current that are less than a first value and that has a second state for values of the load current that are substantially equal to the first value.

11. The method of claim 9 further including coupling the current controller to control a mode of a switch matrix wherein the switch matrix has a plurality of switch configuration modes wherein the switch matrix is configured to receive an input voltage and form an output voltage that is a multiple of the input voltage and is configured to supply the load current and an output voltage to a load.

12. The method of claim 9 further including coupling a third transistor to receive the first reference current and the reference voltage and responsively control a fourth transistor to control the load current to the substantially constant value.

* * * * *